US006993712B2

(12) United States Patent
Ramachandran et al.

(10) Patent No.: US 6,993,712 B2
(45) Date of Patent: Jan. 31, 2006

(54) SYSTEM AND METHOD FOR FACILITATING USER INTERACTION IN A BROWSER ENVIRONMENT

(75) Inventors: Parthasarathy Ramachandran, Foster City, CA (US); Christopher Scott Nash, Emeryville, CA (US); Thomas W. Bowe, Jr., Pleasanton, CA (US)

(73) Assignee: Siebel Systems, Inc., San Mateo, CA (US)

( * ) Notice: Subject to any disclaimer, the term of this patent is extended or adjusted under 35 U.S.C. 154(b) by 684 days.

(21) Appl. No.: 09/967,904

(22) Filed: Sep. 28, 2001

(65) Prior Publication Data

US 2003/0066032 A1 Apr. 3, 2003

(51) Int. Cl.
*G06F 9/00* (2006.01)
(52) U.S. Cl. .......................... 715/513; 715/769; 705/8
(58) Field of Classification Search ................ 715/513, 715/501.1, 769; 705/8; 707/1; 709/203
See application file for complete search history.

(56) References Cited

U.S. PATENT DOCUMENTS

| | | | | |
|---|---|---|---|---|
| 5,745,112 | A | * | 4/1998 | Hirose .......................... 715/769 |
| 5,754,179 | A | * | 5/1998 | Hocker et al. ............... 715/835 |
| 5,835,898 | A | * | 11/1998 | Borg et al. ..................... 705/8 |
| 5,953,731 | A | | 9/1999 | Glaser |
| 6,034,683 | A | * | 3/2000 | Mansour et al. ............. 715/764 |
| 6,049,776 | A | * | 4/2000 | Donnelly et al. ............... 705/8 |
| 6,073,110 | A | * | 6/2000 | Rhodes et al. .................. 705/8 |
| 6,233,591 | B1 | | 5/2001 | Sherman et al. |
| 6,262,729 | B1 | | 7/2001 | Marcos et al. |
| 6,272,673 | B1 | | 8/2001 | Dale et al. |
| 6,393,673 | B1 | | 5/2002 | Kourtidis et al. |
| 6,477,550 | B1 | | 11/2002 | Balasubramanium et al. |
| 6,678,671 | B1 | * | 1/2004 | Petrovic et al. ................. 707/1 |
| 2002/0107914 | A1 | * | 8/2002 | Charisius et al. ........... 709/203 |
| 2004/0103364 | A1 | * | 5/2004 | Domback ................. 715/501.1 |
| 2004/0225958 | A1 | * | 11/2004 | Halpert et al. ............... 715/513 |

OTHER PUBLICATIONS

Microsoft Project—Plan, Manage, and Communicate with Ease (Microsoft Corporation ©1995), http://www.jdr.com/PDF/ms-proj95-u.pdf.*
Prolog Scheduler—Collaborative, Web-Based Scheduling and Resource Management for the Enterprise (Meridian Project Systems ©2002), http://www.pcigrp.com/software/pdf/prolog-scheduler.pdf.*
Pyron, Sams Teach Yourself Microsoft Project 2000 in 24 Hours, Hour 13—Assigning Resources and Costs to Tasks (Sams Publishing, May 1, 2000).*

* cited by examiner

*Primary Examiner*—Doug Hutton
(74) *Attorney, Agent, or Firm*—Perkins Coie LLP (57) ABSTRACT

Techniques to support various operations (e.g., drag-and-drop, stretch) and data manipulation in a browser environment, e.g., to allow data for an object located in one part of a document (e.g., a webpage) to be associated with another object located in another part of the document. In one design, a document includes at least one applet for at least one display window. Each applet includes at least one browser object representative of an entity for an end application. Each browser object is associated with a respective set of one or more scripts used to facilitate a set of one or more operations (e.g., drag-and-drop, stretch) permitted for the browser object. A data transfer object is generated upon initiation of a selected operation and includes data associated with a source (browser) object. The data transfer object may thereafter be operated on by various target (browser) object to effectuate the selected operation.

34 Claims, 8 Drawing Sheets

SYSTEM AND METHOD FOR FACILITATING USER INTERACTION IN A BROWSER ENVIRONMENT

BACKGROUND OF THE INVENTION

The present invention relates generally to computer processing, and more particularly to techniques for providing a high level of user interaction for browser-based applications.

The World Wide Web (commonly known as the Internet) has made it possible for users to access data and software applications stored all over the world from their individual computers. The Internet is a collection of distributed computer networks that interconnect client computers with host computers through a variety of communication means (e.g., wireless and wireless links). Other types of computer network such as local area network (LAN) and wide area network (WAN) are also used to provide interconnectivity among computers.

Through a web browser executing on a client computer, a user is able to easily retrieve information residing on a host computer connected to the client computer via a network. The user initially executes the web browser on the client computer and then specifies a URL link for a desired webpage from the host computer. In response, the webpage is retrieved and downloaded onto the client computer. The webpage typically includes data and URL links to other related webpages.

The browser and computer networks provide an attractive platform upon which a software application designated for widespread use may be implemented. With a browser-based application, a host computer can perform all or the bulk of the data processing, and the client computers can interact with and obtain the required data and processing from the host computer via the browser. Depending on the specific design of the host software application, all that may be required at the client computers is the browser itself to obtain the required data and functionality from the host computer.

Browser-based applications can provide various advantages over other "thick client" applications, which typically require installation of specially designed software on both the host and client computers. These advantages include (1) ease of installation, since the software for browser-based applications is typically only installed on the host computer and not on the client computers, (2) ease of maintenance, since upgrades and other maintenance tasks are performed only on the host computer, (3) high level of connectivity, since any user with a browser and (web) access may be able to interact with the host computer, and other benefits.

Conventionally, browser-based applications can support a limited level of user interaction due in part to the limited capabilities of the browser. Users on client computers can typically download data, execute commands, and perform other functions via keyboard entries and mouse clicks on specifically defined buttons and drop down boxes on webpages. However, as browser-based applications become more complex, a higher level of user interaction is needed. As an example, techniques that allow a user to select and associate data on one part of a webpage with an object located in another part of the webpage (e.g., via a "drag-and-drop" operation) are highly desirable.

SUMMARY OF THE INVENTION

The invention provides techniques to support various operations (e.g., drag-and-drop, stretch, and so on) and data manipulation in a browser environment. These techniques allow data for an object located in one part of a document (e.g., a webpage) to be associated with another object located in the same or another part of the document (or possibly outside the document). These techniques also allow information relating to an object to be added, modified, deleted, and so on, via movements of the object within the document. These techniques further support various functionalities and processes to be invoked by movement of objects. Various actions needed to effectuate these operations and data manipulation may be performed, for example, by scripts included in the document itself and executed by a browser that supports dynamic HTML.

A specific embodiment of the invention provides a method for facilitating user interaction in a browser environment. In accordance with the method, a document (e.g., a webpage) having included therein a number of source and target objects and a number of scripts is initially received. Thereafter, an indication of a particular operation (e.g., a drag-and-drop operation) being initiated on a selected source object is received. In response, a script for the selected source object is executed to generate a data transfer object having included therein data associated with the selected source object. An indication of the particular operation being completed on a selected target object is subsequently received. In response, a script for the selected target object is executed to operate on the data included in the data transfer object to effectuate the (e.g., drag-and-drop) operation, which may entail calling the host computer to update the selected source and target objects. The particular operation may be performed to manipulate data and/or to associate data for one object with another object.

As the selected source object is moved about the webpage toward its intended target, the representation (e.g., a box) for each potential target object may be modified (e.g., with a change in color), the mouse cursor may be changed, or some other feature of the display may be modified to show whether or not a drop of the selected source object onto the target object is permitted. The modification may be performed by the script for the potential target object. The change in the potential target object's representation or the mouse cursor helps to guide an end-user with the drag-and-drop operation.

Another specific embodiment of the invention provides a document (e.g., a webpage) capable of facilitating user interaction in a browser environment. The document includes at least one applet for at least one display window. Each applet includes at least one browser object that is representative of an entity (e.g., an activity, an employee) for an end application (e.g., a dispatch system, which is described below).

Each browser object is further associated with a respective set of one or more scripts used to facilitate a set of one or more operations (e.g., drag-and-drop and stretch operations) permitted for the browser object.

Each browser object may be a source object if it can be selected to originate a particular operation, and may (alternatively or additionally) be a target object if it can be selected as a destination for a particular operation. In this case, the script for each browser object would perform the appropriate set of actions depending on if the browser object is selected as a source object or a target object for a particular operation.

The invention further provides other methods, documents (e.g., webpages), software codes, and systems capable of implementing various aspects, embodiments, and features of the invention, as described in further detail below.

The foregoing, together with other aspects and embodiments of this invention, will become more apparent when referring to the following specification, claims, and accompanying drawings.

DESCRIPTION OF THE SPECIFIC EMBODIMENTS

Figure 1:
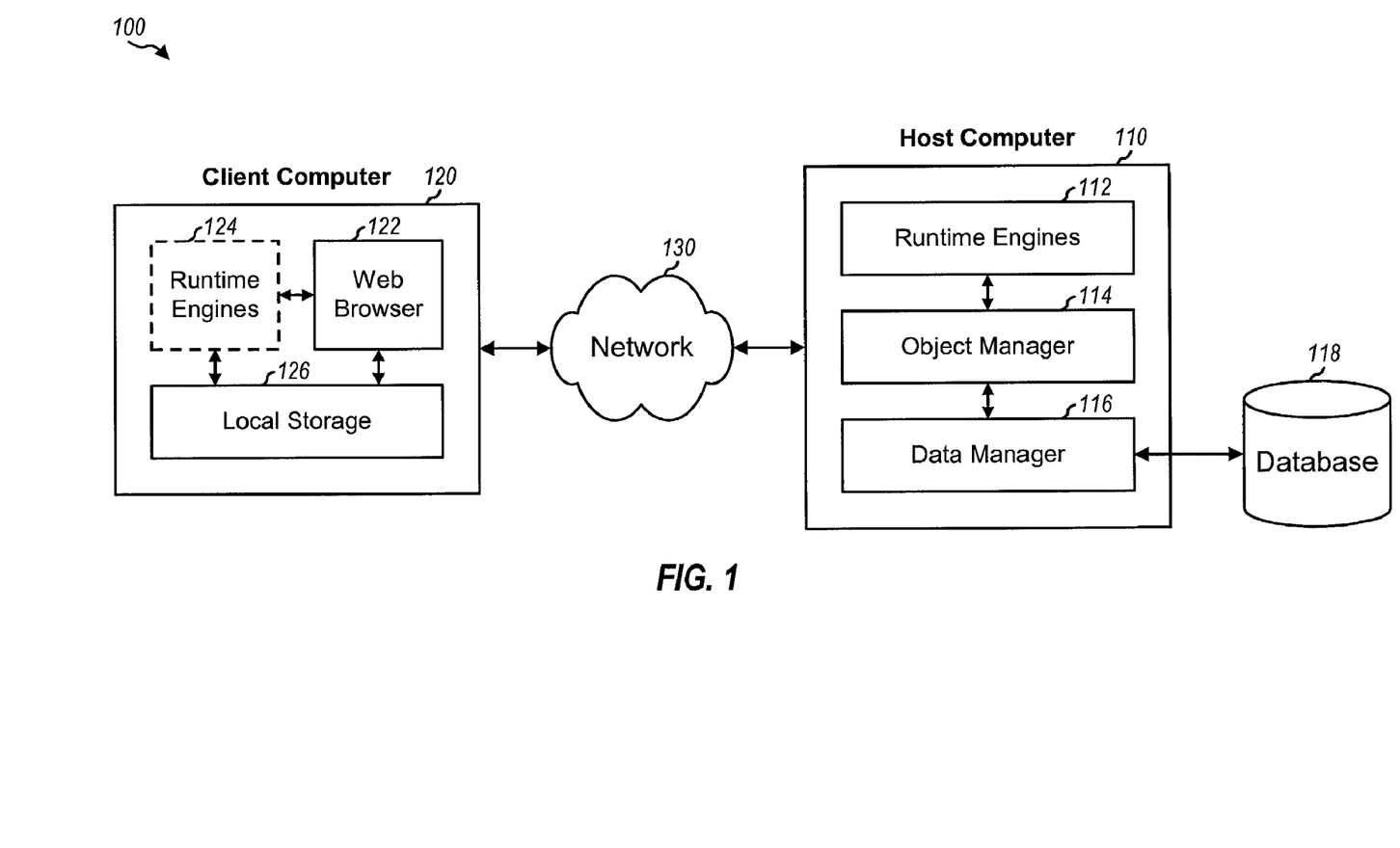
FIG. 1 is a diagram illustrating a computer network in which various aspects and embodiments of the invention may be implemented.

FIG. 1 is a diagram illustrating a computer network 100 in which various aspects and embodiments of the invention may be implemented. Computer network 100 may include any number of client computers 120 coupled to one or more host computers 110 via a network 130, which may be the Internet, a LAN, a WAN, some other type of network, or a combination thereof. Only one client computer and one host computer are shown in FIG. 1 for simplicity.

In the embodiment shown in FIG. 1, host computer 110 includes runtime engines 112, an object manager 114, and a data manager 116. Runtime engines 112 execute one or more software applications that provide the required functionality. An example software application for a dispatch system is described in further detail below.

Object manager 114 interfaces with runtime engines 112 and manages the interaction with a central database 118. In an embodiment, object manager 114 manages business objects (BO), business services (BS), and business components (BC) (all three not shown in FIG. 1 for simplicity). The business objects model major entities (e.g., schedules, activities, and employees for the dispatch system) for the software applications with associated business rules. Each business object is made up of a hierarchy of parent-child components, which model relationship with appropriate specialized operations. The business services are basic components for building complex behavior. New business services may be created and linked into multi-step control flows to provide complex behavior encompassing multiple business objects. The business components provide real time access to remote objects without replication of data within database 118. A business object may be made up of a number of business components managed by the runtime engines.

Data manager 116 manages database 118 and, in an embodiment, performs this function by invoking SQL objects. Database 118 stores data for the software applications executed by runtime engines 112 and typically stores the data in a "raw" form based on a particular schema.

In an embodiment, client computer 120 includes a web browser 122, (optional) runtime engines 124, and a local storage 126. Web browser 122 is a client software program that uses Hypertext Transfer Protocol (HTTP) to make requests of servers (e.g., host computer 110) on behalf of a browser user. Web browser 122 provides user interface (e.g., screens) to present information to the user and further receives and interprets user inputs (which may be provided via mouse clicks, mouse movements, keyboard inputs, and other means). Web browser 122 also provides the means to download and send data (e.g., from/to host computer 110) and to process the data based on the user inputs. Web browser 122 may be a commercially available software application such as Navigator™ from AOL-Time Warner, Inc. or Internet Explorer™ from Microsoft Corporation.

For certain embodiments, client computer 120 may include runtime engines 124, which may execute all or some of the software applications executed on runtime engines 112 at host computer 110. Runtime engines 124 allow some of the processing to be performed by client computer 120, which may alleviate the amount of data exchanges between client computer 120 and host computer 110. Runtime engines 124 further allow client computer 120 to be operated in a stand-alone configuration (i.e., not connected to host computer 110) when necessary or as desired.

Local storage 126 stores data for web browser 122 and runtime engines 124. For example, documents (e.g., webpages) are retrieved from host computer 110 by web browser 122 and stored to local storage 116 to allow for fast and efficient access to the webpages. Local storage 116 may be implemented with a semiconductor memory (e.g., RAM, Flash), a hard disk, or some other data storage technology that can provide fast access to the data stored thereon.

The invention provides various techniques to support a high level of user interaction and data manipulation in a browser environment. In an aspect, a framework is provided which supports various operations on objects and further allows for complex manipulation of data. The framework defines various types of data element (i.e., "browser objects", which are records of data), various types of display representation for the data elements (e.g., a list table, a Gantt chart, and so on), and various operations (e.g., drag-and-drop) that may be performed on the data elements. For each supported operation, the framework defines a set of actions to be performed by/on the affected data elements to effectuate the operation. Within this defined framework, data may be manipulated in various ways via the supported operations, and various other functionalities and processes may also be supported. For example, an object located in one part of a document (e.g., a webpage) may be associated with another object located in another part of the document via a drag-and-drop operation.

Various aspects and embodiments of the invention may be implemented within computer network 100, which may be used to support various types of software application, such as customer relationship management (CRM) applications, employee relationship management (ERM) applications, and others. For clarity, various aspects and embodiments of the invention are described for a specific CRM application, which is a dispatch system used to assign and schedule activities to employees. Moreover, although the techniques described herein may be used in conjunction with various types of documents, for clarity, various aspects and embodiments of the invention are specifically described for webpages or HTML documents.

Webpage for Dispatch Board

Figure 2A:
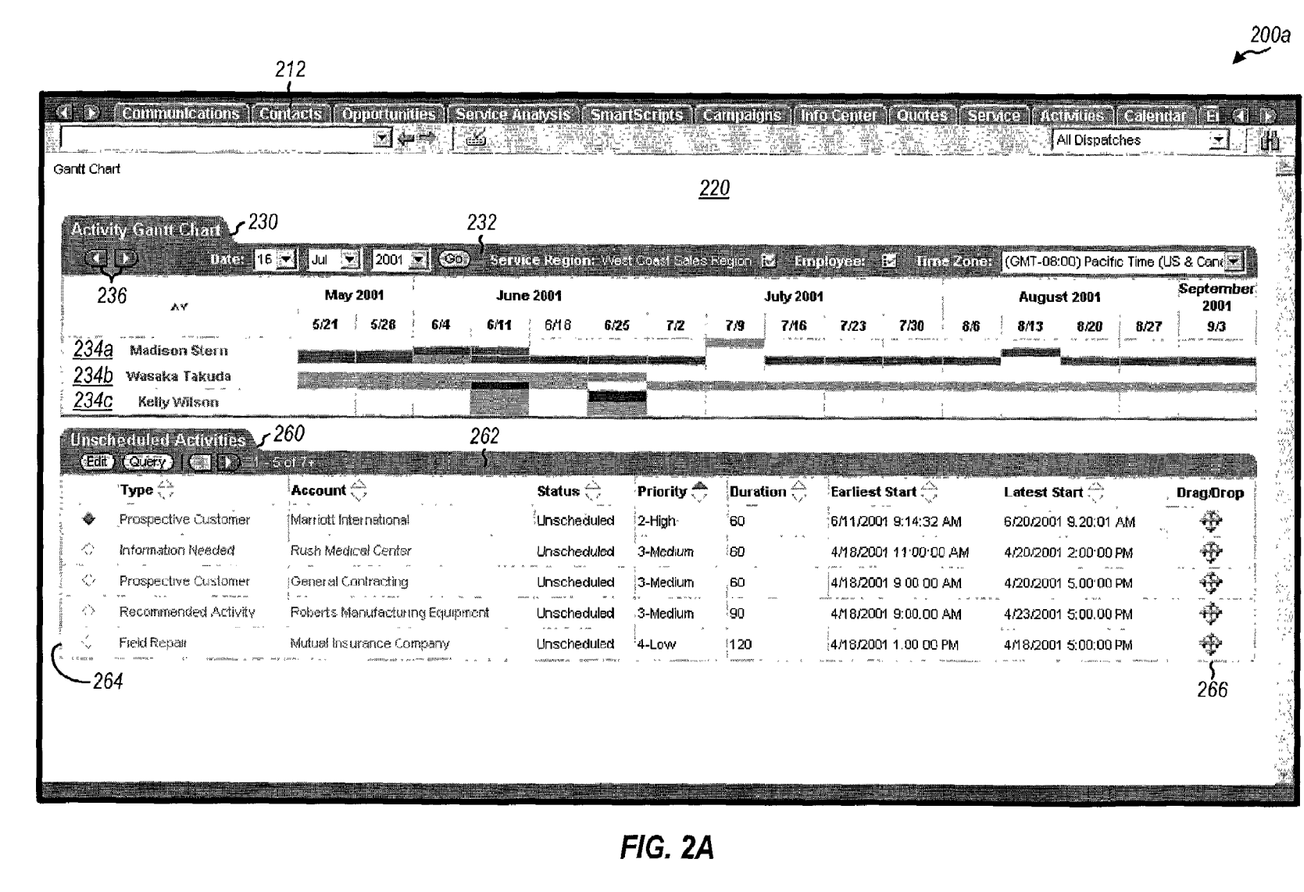
FIGS. 2A through 2C illustrate three documents (e.g., webpages) capable of facilitating various operations, in accordance with embodiments of the invention.

FIG. 2A illustrates a document 200a (e.g., a webpage) for a "dispatch board", which is used to display information for activities and employees and to facilitate the assignment and scheduling of activities, in accordance with a specific embodiment of the invention. The dispatch board may be used by a dispatcher (i.e., an end-user) to (1) display the available and pertinent information in a clear and organized manner to allow the dispatcher to make prompt and cost-effective decisions for assignments of activities to employees, (2) provide extensive capabilities to add, change, and schedule assigned activities, and (3) perform other functions.

The dispatch board includes main tabs 212 and a main display area 220. Main tabs 212 may be used to invoke various end applications, functionality, and features provided by the overall system. In such a design, the dispatch system may represent just one of multiple available end applications.

Main display area 220 may be used to present information for the selected end application. In the specific embodiment shown in FIG. 2A, main display area 220 presents information for the dispatch system and includes an Activity Gantt Chart "applet" 230 used to display the available employees and their scheduled activities and an Unscheduled Activities applet 260 used to display unscheduled activities. As used herein, an applet is a high-level object for a display window used to present a particular collection of data. The display window may be defined to have any size and shape, although a rectangular shape is typically used. An applet presents data in a specific layout and design, and multiple applets may be designed and used to display the same collection of data. A document may be designed to include any number of applets.

Each applet typically includes a number of fields, and each field may represent a particular type of data, a particular parameter, a particular action that may be performed in the applet, and so on. Each field is typically represented with a lower-level object, which may be a button, a list box, a display region, or some other representation.

Activity Gantt Chart Applet

FIG. 2A shows an embodiment of Activity Gantt Chart applet 230 (or simply, a chart applet) used to display a schedule for a particular time window for the dispatch system. In the embodiment shown, chart applet 230 includes a header 232 having (1) date list boxes that allow the dispatcher to select the starting date for a Gantt chart displayed in applet 230, (2) a section that lists the service region and employees covered by the Gantt chart, and (3) a list box that allows the dispatcher to select a particular time zone.

In an embodiment, chart applet 230 displays a current schedule for a group of employees using a Gantt chart. Other types of chart may also be used and are within the scope of the invention. The Gantt chart displays data on a y-axis versus x-axis to show scheduled activities and other events versus time. The two top rows of the Gantt chart display headers with date and (if appropriate) time information. Each data row below the header rows corresponds to a record 234 and may be used to display a schedule for an employee. The specific group of employees to be displayed in chart applet 230 may be selected based on one or more criteria (e.g., by service regions, employees, skills, parts, and so on).

The first column in the Gantt chart is a header column used to identify the employees. Each column to the right of the header column is a data column used to display assignment and scheduling information. Each data column covers a particular time slot, which is one week for the specific embodiment shown in FIG. 2A but other time slots may also be selected by the dispatcher via an Options menu. The width of the data columns may be fixed (e.g., by a default value), and the number of columns is typically determined by the size of the display window. The chart may be configured to display a particular time window (e.g., several months) of a calendar. The dispatcher may configure the Gantt chart (e.g., via the date list boxes in header 232) to display a different time window (e.g., a different set of months) of activities or may configure the chart (e.g., via the Options menu) to display a different-size time window (e.g., one week) of activities, in which case the time slot covered by each data column is correspondingly changed.

Each cell in the Gantt chart is formed by the intersection area between one row and one column. The cells in the data columns (i.e., data cells or data boxes) may be configured to display data using one or more schemes (e.g., with different colored boxes, outline, shading, text, or a combination thereof). The data displayed in these data cells may span multiple cells in the same row. In one embodiment, data is constrained from spanning multiple cells in the same column. In an alternative embodiment, data may be allowed to span multiple cells in the same column (e.g., if two or more employees are needed or recommended for a particular activity).

Scroll buttons 236 are provided to allow the dispatcher to span (or scan) across columns in the grid portion of the Gantt chart, i.e., the data columns. A vertical bar or vertical scroll buttons may also be provided, if needed, to allow the dispatcher to scroll through the available employees across rows, except the header rows. The horizontal and vertical scroll buttons may be made visible on the display window (e.g., automatically, if necessary) based on the amount of data to be displayed.

Various schemes may be used to present data in the grid portion of the Gantt chart (i.e., the data portion, except the header rows and column). In one scheme, data is displayed as solid colored boxes with outline. Each data box represents a particular "event", which may be an activity that has been assigned and scheduled or some other information (e.g., non-schedulable or non-working times for an employee). The outline of a data box typically corresponds to the time duration for the associated event (e.g., the scheduled time for an activity). In an embodiment, the dispatcher may be able to expand or shrink the size of a data box by using the mouse (e.g., by clicking on an edge of the box and dragging the edge).

The color of each data box may be based on a particular color-coding scheme that typically uses different colors to differentiate between different types of event (e.g., different types of activity). For example, non-schedulable times for employees may be represented with data boxes of one color (e.g., orange), and scheduled activities may be represented with data boxes of another color (e.g., green) or boxes of different colors to represent their status and priority. The color scheme may be configurable to suit the preferences of the individual dispatcher.

The data boxes may also be configured to display additional information related to the associated events (e.g., activity type, status, account, description, and so on, or a combination thereof). If the text is too long to fit in a data box, then it may be abbreviated or truncated. The data boxes may also be configured such that full text is displayed for an event when the cursor is placed over the box (e.g., without the need to click on the mouse button).

Unscheduled Activities Applet

FIG. 2A also shows an embodiment of Unscheduled Activities applet 260 used to display a list of unscheduled activities. In the embodiment shown, Unscheduled Activities applet 260 includes a header 262 having (1) an Edit button that allows the dispatcher to edit a selected unscheduled activity, (2) a Query button that allows the dispatcher to search for unscheduled activities, and (3) scroll buttons that allow the dispatcher to display other fields for the unscheduled activities.

In an embodiment, Unscheduled Activities applet 260 displays a list of unscheduled activities using a list table, and is thus referred to as a list applet. Other types of display may also be used and are within the scope of the invention. The top row of the list table displays headers for various fields of the unscheduled activities. Each data row below the header row corresponds to a record 264 and may be used to display a particular unscheduled activity. The specific activities to be displayed in list applet 260 may be selected based on one or more criteria (e.g., by service region). The number of data rows (i.e., the number of records 264) to be displayed in list applet 260 may be determined by the size of the display window, and scroll arrows are provided (if necessary) to allow the dispatcher to scroll through all applicable activities.

In an embodiment, each record included in list applet 260 is associated with an object in a column 266, which may be used for various operations (e.g., drag-and-drop, as described below). In another embodiment, any field of record 264 may be selected and used for the supported operations.

Various other designs and features may also be used for the chart applet and the list applet. An alternative design is described in U.S. patent application Ser. No. 09/810,007, entitled "System and Method for Assignment and Scheduling Activities," filed Mar. 16, 2001, assigned to the assignee of the present application and incorporated herein by reference.

For the dispatch system, activities may be generated by various means such as by operators in a call center, by customers via the web, and so on. These activities are initially categorized as unscheduled in most instances and may be selected for display in list applet 260, which is then the starting point for assigning and scheduling activities.

Figure 2B:
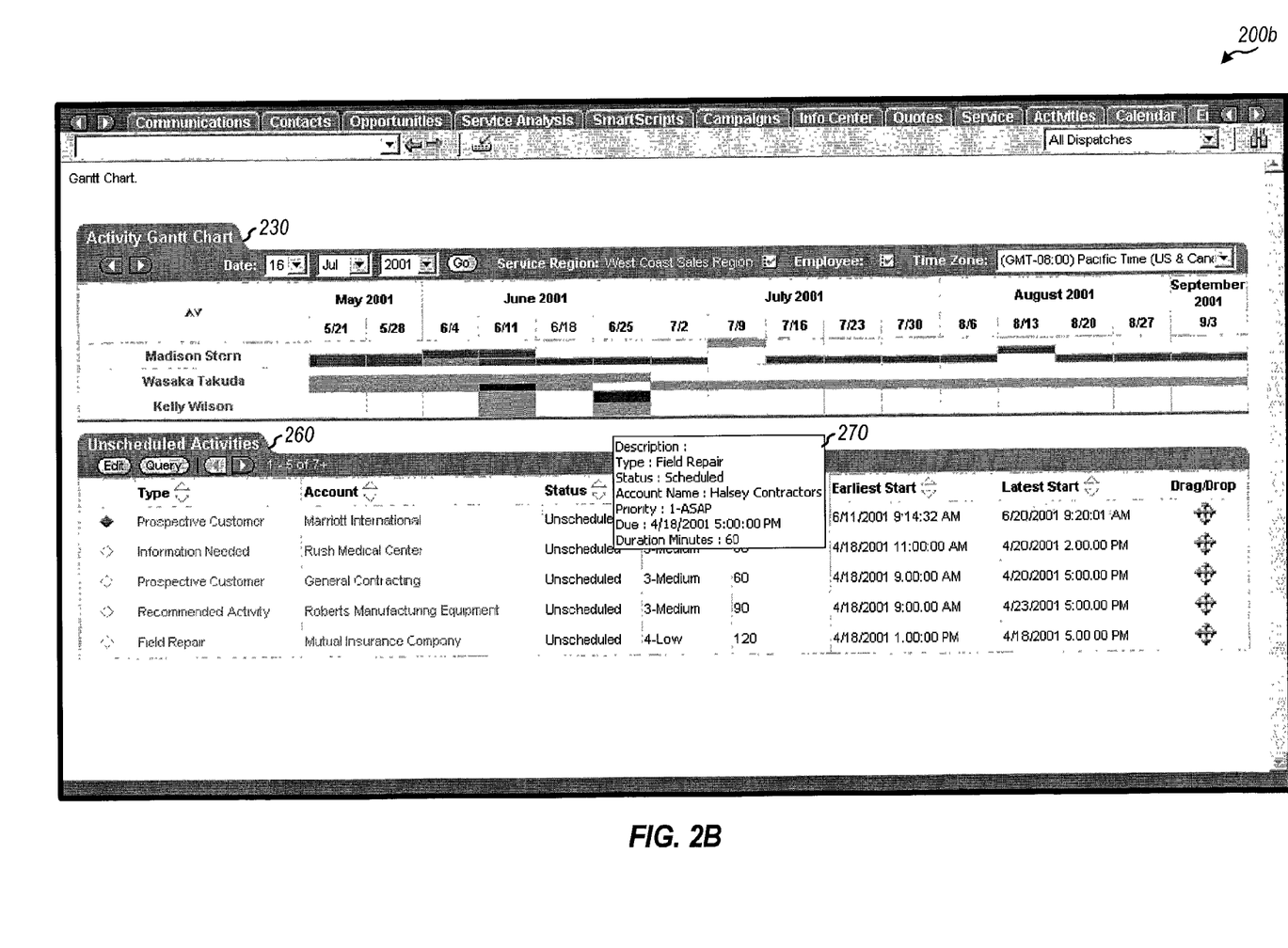

FIG. 2B shows a webpage 200*b* in which additional information is provided via a pop-up applet 270 (e.g., to assist the end-user perform certain operations). In this example, pop-up applet 270 is displayed in response to the end-user clicking on a record in list applet 260, and includes various types of information for the activity represented by the selected record. Although not shown in FIG. 2B, pop-up applets may also be used to provide additional information for other items in the webpage such as, for example, the employees listed in chart applet 230, the scheduled activities and other events in the Gantt chart, and so on.

Drag-and-Drop Operation in a Browser Environment

A high level of user interactivity may be provided for the dispatch board to facilitate the assignment and scheduling of activities to the available and qualified employees. In particular, an unscheduled activity may be assigned and scheduled by selecting the activity in list applet 260, dragging the selected activity over to a particular employee and for a particular time slot in chart applet 230, and dropping the activity on the target employee and time slot. This "drag-and-drop" operation may be implemented with a software application executed on the client computer (i.e., a "thick client"), as described in the aforementioned U.S. patent application Ser. No. 09/810,007.

Implementation of the drag-and-drop operation in a browser environment is much more challenging than for a thick client because most browsers provide only a limited set of events that may be used to effectuate the drag-and-drop operation. In particular, Internet Explorer™ 5 provides 21 different events for a Document class object that may be used to represent a webpage (i.e., an HTML document). Of these, seven events relate to drag and drop actions and are listed below:

ondrag—this event fires continuously on a source object during a drag operation;

ondragstart—this event fires on the source object when the user first starts to drag a selection of text or an object (i.e., a document item) associated with the source object;

ondragenter—this event fires on a target object when the document item being dragged enters a drop target that is valid;

ondragover—this event fires on the target object while the document item being dragged is over the valid drop target;

ondragleave—this event fires on the target object when the document item being dragged moves out of the valid drop target;

ondragend—this event fires on the source object at the close of the drag operation when the mouse is released; and ondrop—this event fires on the target object during a drag-and-drop when the mouse is released.

An aspect of the invention provides techniques to effectuate drag-and-drop operations in a browser environment to allow data for an object located in one part of a webpage (e.g., list applet 260) to be associated with another object located in the same part or another part of the webpage (e.g., chart applet 230). Various actions needed to effectuate drag-and-drop operations may be performed by scripts executed by a browser that supports dynamic HTML.

Browser Object

In general, a document (e.g., a webpage) may be designed to include any number of applets, and each applet may be for a respective display window, such as applets 230 and 260 in FIG. 2A for a Gantt chart and a list table, respectively. Each applet may further include any number of (i.e., zero or more) "source" objects and any number of (i.e., zero or more) "target" objects. Each source object may be selected and dragged via a drag-and-drop operation. Each target object may be a destination upon which a source object may be dropped, if a set of (zero or more) criteria specified for the drop is satisfied.

In an embodiment, each source object may be associated with pertinent data related to an entity (e.g., an activity on the dispatch board) that is represented by the source object. For an activity, the pertinent data may include the account name, the activity's type and location, its status and priority, the skills, parts, and time duration required to perform the activity, the due date, the earliest and latest start times, and so on. In an embodiment, each source object is further associated a respective script (i.e., program codes) that performs the necessary processing at the start of a drag-and-drop operation.

In an embodiment, when a source object is selected and a drag is initiated, the selected source object's script generates a "data transfer object" for the drag-and-drop operation. In one embodiment, this data transfer object includes some or all of the pertinent data associated with the selected source object, and the included data may be used for various actions during the drag-and-drop operation. For a source object that represents an activity, the data transfer object generated by the source object may include some or all of the data described above. In another embodiment, this data transfer object includes a link to the source object from which pertinent data may be obtained. The data transfer object may also be implemented in other manners and this is within the scope of the invention.

Each target object similarly represents a particular entity on an applet. For the dispatch board shown in FIG. 2A, each target object in chart applet 230 may represent a respective data box in the grid portion of the Gantt chart, and this data box covers a particular time slot for a particular employee included in the Gantt chart. Each target object may also be associated with pertinent data related to the entity represented by the target object. For the Gantt chart, the pertinent data for each data box may include (1) the time duration being represented by the data box, and (2) the data for the employee associated with the data box. Each data row in the Gantt chart corresponds to a record for an employee and may be identified by a respective record ID. Each data column in the Gantt chart corresponds to a particular time slot and may also be identified by a respective column ID. Each data box may thus be identified by its respective set of record and column IDs, and the pertinent data for the data box may be obtained by first identifying the record and column IDs.

In an embodiment, each target object is further associated with a respective script that performs the necessary processing to guide and/or complete a drag-and-drop operation. In an embodiment, the target object's script performs a first set of actions when the document item for a selected source object (or just simply, the selected source object) is dragged into the target object, a second set of actions when the source object is dragged out of the target object, and a third set of actions if the source object is dropped onto the target object. The specific actions to be performed are dependent on the data associated with the source and target objects and the specific design of the target object's script.

When a selected source object is dragged into a target object, the target object's script executes and determines whether or not a drop of the source object onto the target object is permitted. This determination can be made by extracting the data included in the data transfer object (which is generated by the source object for the drag-and-drop) and checking the extracted data with the pertinent data associated with the target object. For the dispatch board, the following may be performed (1) the skills and parts required to perform the activity may be checked against the capabilities of the target employee, (2) the location where the activity is to be performed may be checked against the service region where the employee is based, (3) the due date, time duration, and earliest and latest start times for the activity may be checked against the availability of the employee, and so on. These checks (or tests) effectively form a set of one or more criteria for the drop and may be specified in the target object's script.

In an embodiment, the target object's script may modify the applet's display window depending on whether or not a drop of the selected source object onto the target object is permitted. If a drop is permitted, then the data box for the target object may be modified (e.g., by a change to a new color, such as green), a pop-up applet may be generated with the appropriate text (e.g., "drop OK"), an icon at the tip of the cursor may be changed (e.g., to a different shape), and so on. Otherwise, if a drop is not permitted, then the data box may be maintained or modified differently (e.g., by a change to a different color, such as red), a pop-up applet may be generated with the appropriate text (e.g., "drop not permitted"), the cursor icon may be maintained or changed differently, and so on. The modified display may be maintained for the duration in which the source object is over the target object.

When the selected source object is dragged out of the target object, the target object's script can restore the display window to its original condition (i.e., prior to the source object being dragged into the target object). This may entail changing the data box for the target object back to its original color, removing the pop-up applet, and so on.

As the selected source object is dragged over a series of target objects, each affected target object's script executes at the appropriate times, as the source object is moved into and out of the target object, to highlight the display window to assist in the drag-and-drop operation.

When the selected source object is dropped onto a particular target object, and if the drop is permitted, the target object's script executes and performs a set of actions to effectuate the drop. A wide variety of actions may be performed by the target object's script, depending on its specific design. For example, the target object's script may (1) extract the data included in the data transfer object, (2) initiate a call to the host computer to notify it of the drop and provide the extracted data, (3) receive and display updated data from the host computer (e.g., an updated webpage), (4) generate emails to notify the affected employee(s) of the drop, and so on.

Each successful drag-and-drop operation may thus be associated with a particular source object, one or more target objects that are potential drop targets, and a particular target object that is the actual drop target. The source object and actual drop target may be located within the same or different applets.

In an embodiment, a host software application executing on runtime engines 112 at the host computer performs the processing required to effectuate a drop. This software application further maintains a central database for the system and updates this database upon receiving the notification of the drop from the client computer. For the dispatch system, this database update may include modifying the status of the affected activity from unscheduled to scheduled (or vice versa, if the activity is being de-scheduled), updating the schedule for each affected employee, updating the schedule for the service region, and so on.

In another embodiment, a client software application executing on runtime engines 124 at the client computer maintains a temporary database and updates this database upon receiving the notification of the drop. This client software application and temporary database may be used to reduce the amount of traffic exchanged between the client and host computers, which may improve performance. Periodically and/or as necessary, the temporary database at the client computer may be synchronized (i.e., updated) to the central database maintained by the host computer.

For enhanced flexibility, various characteristics of the drag-and-drop operation may be configured via drag-and-drop fields specified within a Tools menu. Via the Tools menu, an administrator may be able to set what fields are to be updated upon completion of a drag-and-drop operation. Different sets of fields may be changed depending on the specific applet in which the source object is located and the specific applet in which the target object is located. For the dispatch system, different sets of fields may be changed if a source object is dragged from list applet 260 into chart applet 230, from chart applet 230 to chart applet 230, or from chart applet 230 into list applet 260. Some fields that may be filled for a drop include (1) the Planned Start Time for an activity scheduled via the drag-and-drop operation, which may be set to the start time indicated by the data box where the drop occurred, (2) the status of the activity, which may be set to "scheduled", (3) the No Sooner Than time for the activity, which may be set to the Planned Start Time, and so on.

Each applet on a webpage may include any number of (zero or more) "browser objects". Each browser object may be a source object, a target object, or possibly both a source and a target object. Referring to FIG. 2A, each activity (i.e., each data row) in list applet 260 may be associated with a respective browser object that can be the source object for a drag-and-drop operation to schedule the activity. Each activity in list applet 260 may also be a target object for a drag-and-drop operation to unschedule an activity that was previously scheduled. Thus, a browser object may be associated with a first script that is executed if the browser object is selected as a source object and a second script that is executed if the browser object is selected as a target object. In an embodiment, the specific script to be executed is determined by the specific event being fired on the browser object (e.g., ondragxxx or ondrop).

Referring to FIG. 2A, each browser object in chart applet 230 may be a target object for a drop of a source object (e.g., an activity) or may be a source object that is dropped onto another target object. For example, to reschedule an activity, the source object for the activity may be selected, dragged over to another target object for another employee and/or another time slot, and dropped onto that target object. A scheduled activity may also be de-scheduled by selecting the source object for the activity, dragging it over to list applet 260, and dropping it (e.g., anywhere) on the list applet.

Each browser object may be associated with various types of information. In a specific embodiment, each browser object includes the following:

the identity of the particular business object that represents the browser object (e.g., the business object for an activity or an employee);

the identity of the database fields that need to be modified to effectuate each supported action (e.g., a scheduling, a cancellation, a re-assignment, a de-scheduling) that may be achieved via the drag-and-drop operation;

the record ID for the record that may be dragged (e.g., the row ID for list applet 260);

the specific actions that may be performed for, or on, the browser object;

additional information that may be needed to perform other actions (e.g., names of the fields from which contact names may be picked up to send notification emails).

Figure 3:
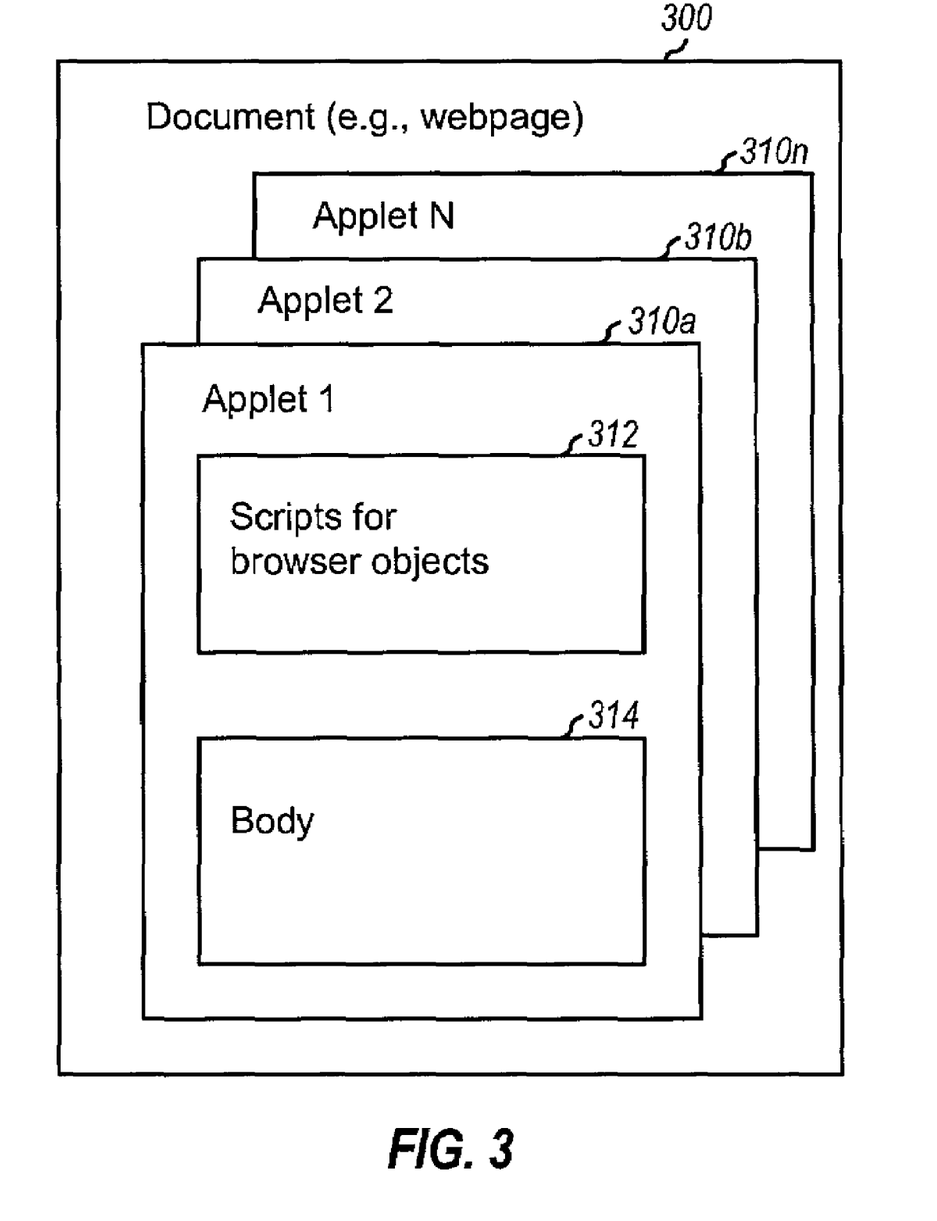
FIG. 3 is simple a diagram illustrating an embodiment of a document (e.g., a webpage)

FIG. 3 is simple a diagram illustrating an embodiment of a document 300, which may represent a particular webpage (e.g., for the dispatch board shown in FIG. 2A). Document object 300 includes a set of one or more applets 310. Each applet 310 may be used for a particular display window (e.g., for the Gantt chart or the list table shown in FIG. 2A). Each applet 310 may further include one or more scripts 312 for one or more browser objects included in the applet. Each applet 310 further includes a body 314 that defines the display window for that applet. In the embodiment shown in FIG. 3, document 300 includes all data and scripts needed to display the corresponding webpage and to effectuate drag-and-drop operations on browser objects included in the webpage.

Document 300 may be downloaded from the host computer onto the client computer in response to a request for a new document or in response to a drag-and-drop operation on a selected object. Document 300 is typically stored to the local storage (e.g., a cache) in the client computer, and the necessary portion of the document may be accessed from the local storage and operated on by the scripts as necessary. For example, a data transfer object generated by the source objects' script may be stored to the local storage until needed.

In an embodiment, to reduce the amount of traffic to be exchanged by the client and host computers and to further reduce unnecessary processing, data is loaded as needed. Each document includes data for a specific time window, e.g., as requested by the end-user. If the end-user requests data for another time window, then another document for that time window may be generated and provided to the client computer.

Figure 4:
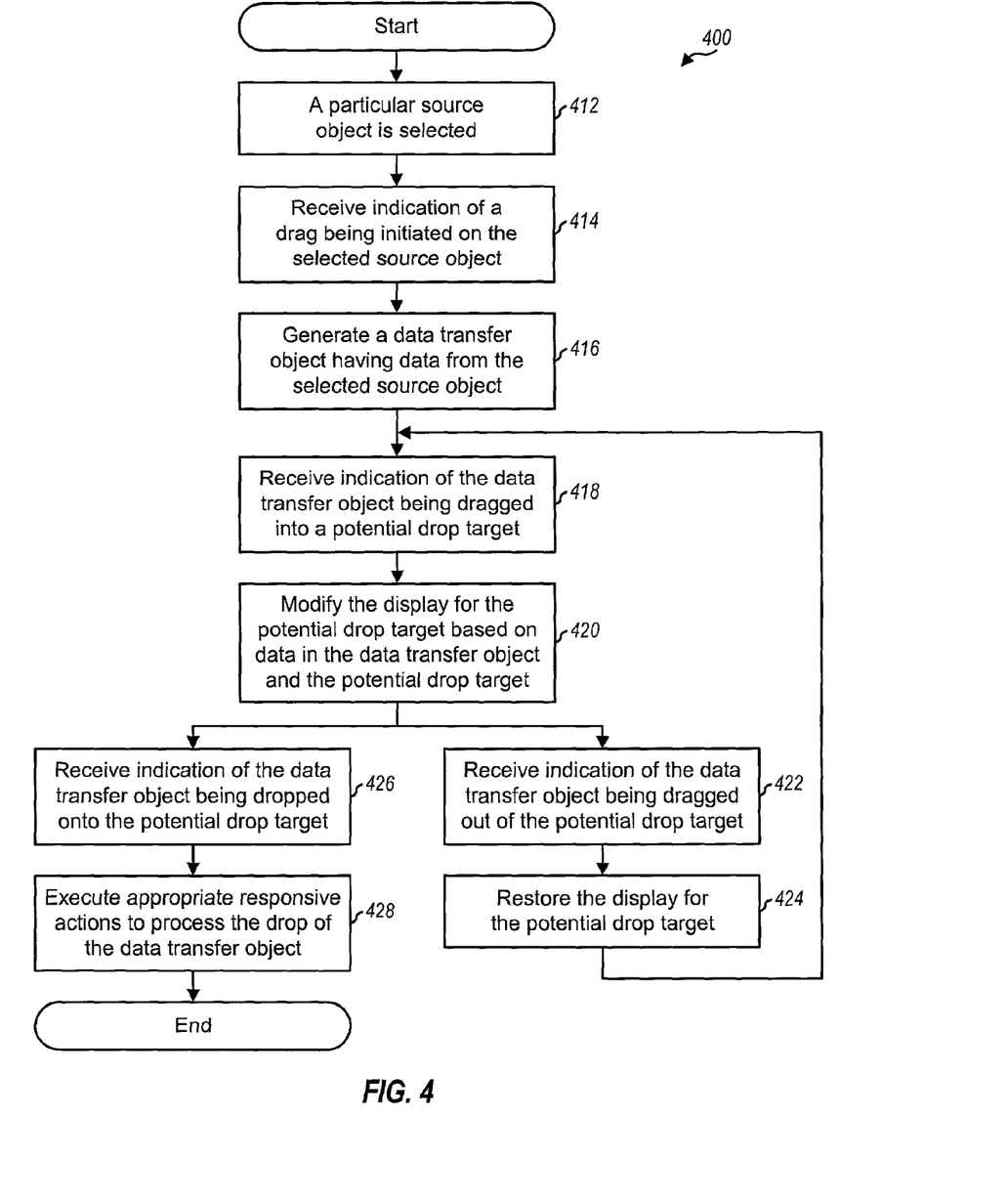
FIG. 4 is a flow diagram of an embodiment of a process to effectuate a drag-and-drop operation in a browser environment.

FIG. 4 is a flow diagram of a process 400 to effectuate a drag-and-drop operation in a browser environment, in accordance with an embodiment of the invention. Initially, a particular source object located in one part of a webpage (e.g., a particular activity in list applet 260) is selected (e.g., via a mouse click), at step 412. The selected source object may be appropriately highlighted (e.g., with a different color, shading, or shape). Next, an indication is received of a drag being initiated on the selected source object, at step 414. The drag may be initiated by depressing the mouse while it is placed over the source object and moving the depressed mouse. The drag start may be indicated by the firing of the ondragstart event on the selected source object.

In an embodiment, each source object is associated with a script that may be executed in response to the occurrence of a specific event (e.g., the ondragstart event). Upon receiving the indication of the firing of the ondragstart event, the script for the selected source object generates a data transfer object that includes various types of data derived from a record associated with the selected source object, at step 416. The data transfer object may be stored to the local storage and may thereafter be used by other target objects to effectuate the drag-and-drop operation.

As the mouse is moved over various parts of the webpage, an indication may be received of the data transfer object being dragged into a potential drop target, at step 418. A potential drop target is a browser object on the webpage that may potentially receive the selected source object, e.g., if certain specified criteria are satisfied. The "drag enter" may be indicated by the firing of the ondragenter event on the potential drop target.

Upon receiving the drag enter indication, the potential drop target executes its script, which then operate on the data included in the data transfer object. This script may perform certain actions to effectuate this portion of the drag-and-drop. For the dispatch system, the script can determine (1) whether or not the employee associated with the potential drop target has the required skills and parts for the activity represented by the selected source object, (2) whether or not the time period required for the activity can fit within the available time of the employee, and so on. The script then modifies the display based on the results of the determination, at step 420. For example, if all criteria are satisfied, then the display can be modified to signal that a drop onto this drop target is permitted (e.g., by a change of color on the data box for the potential drop target, by displaying a pop-up applet with the appropriate text, and so on). Otherwise, if all criteria for a drop are not satisfied, then the display can be modified to signal that a drop onto this drop target is not permitted (e.g., by not changing the appearance of the data box for the potential drop target, or by changing it to another color, and so on). The modified display may be maintained for as long as the data transfer object is within the potential drop target.

If the data transfer object is thereafter dragged out of the potential drop target, an indication may be received of such event, at step 422. This "drag out of" may be indicated by the firing of the ondragleave event on the potential drop target. Upon receiving such indication, the script can restore the display to it previous condition, at step 424. Steps 418 through 424 may be performed each time the data transfer object is dragged over a potential drop target.

Subsequently, an indication may be received of the data transfer object being dropped onto a drop target object, at step 426. This drop may be achieved by releasing the mouse button and may be indicated by the firing of the ondrop event on the drop target object. Upon receiving the drop indication, the drop target object's script executes and performs the necessary actions to effectuate the drag-and-drop, at step 428. A wide variety of actions may be performed by the script, depending on its design, as described above.

The webpage may be updated in various ways to reflect the drag-and-drop operation. In one embodiment, upon receiving and processing the drop at the host computer, an updated webpage having updated data is sent to the client computer, which then displays the webpage. In another embodiment, the host computer sends updated data for only the affected portions of the webpage, such as the records for the source and target objects. The client computer then updates only the affected portions with the received data. In yet another embodiment, the client computer performs the processing for the drop and updates the entire webpage or only the affect portions of the webpage.

Other User Interactions

The techniques described herein to implement drag-and-drop operation in a browser environment may also be used to implement other operations on browser objects included in a webpage. Some of these operations are described below. Other operations may also be implemented and are within the scope of the invention.

Resizing Action. A data box (e.g., the time for a particular activity in chart applet 230) may be extended or shortened via a "stretch" operation. This operation may be accomplished by selecting an edge of the data box and dragging the edge to a desired width. The browser is able to distinguish between the edge and the body of the data box. When an edge is selected, the shape of the cursor may be changed (e.g., similar to that when a column in a list or a chart is selected for adjustment).

If the selected edge is dragged over onto another target object, the display may be modified and/or highlighted according to assist with the stretch operation. For example, the data box for the potential target object may be changed to one color (e.g., green) if the selected data box (e.g., for an activity) can be stretched into this target object, or may be changed to another color (e.g., red) if the data box cannot be stretched into the target object. Similar to the drag-and-drop operation, the script for the selected source object may be designed to effectuate the stretch operation (e.g., generate the data transfer object upon initiation of a stretch operation).

Pop-Up Applet. If a particular browser object (e.g., on the Gantt chart) in the webpage is selected, a pop-up applet may be generated and used to show additional information for the selected object, as shown in FIG. 2B. The data in the pop-up applet may also be edited (e.g., directly on the pop-up applet). The specific fields to be displayed on the pop-up applet may be made configurable via the Tools menu.

New Items. A new item may be created on an applet (e.g., on the Gantt chart) by clicking and dragging in an open area. Information for the newly created item may be entered (e.g., by the end-user) or may be extracted from other objects included in the applet or the webpage.

Generic Applet and Object Classes

FIG. 2A shows a specific design of a webpage for the dispatch system. In general, other webpages may be designed for other end applications. In an embodiment, the Gantt chart applet and the list applet are designed as generic classes of object. These applets may then be tailored for specific end applications by populating the chart and list applets with different headers and different types of data. For the dispatch system, which is a specific end application, the Gantt chart is populated with employees (e.g., for a particular service region). For other end applications, the header (i.e., leftmost) column in the Gantt chart may be filled with the other types of "axis objects" instead of employees. Various schemes may be used to populate the chart and list applets, and some of these schemes are described below.

In a first scheme, the specific list applet selected for display on a webpage determines the data to be displayed in the Gantt chart on the webpage. For example, if the list applet includes activities as shown in FIG. 2A, then the Gantt chart includes employees to which the activities may be assigned and scheduled.

In a second scheme, the columns in the Gantt chart are programmatically filled by passing either an array or a reference to a designated table, which then identifies the specific axis objects (e.g., the specific employees) to be used for the header column. As an example, a Find Employees table may be used to store the results of a search for employees based on some particular set of criteria, and the results in this table may then be funneled into the header column of the chart applet.

In a third scheme, an end-user can manually adds axis objects or modify an existing list of axis objects, e.g., by right-clicking and selecting a "New Record" button provided on the chart applet. This user action would not create a new axis object, but merely adds an already defined axis object to the list. The end-user may also remove an axis object from the list by selecting a "Delete Record" button provided on the chart applet.

In a fourth scheme, an administrator may be able to select (via the Tools menu) the specific type of business objects to be used as the axis objects (e.g., employees) and the specific type of business objects to be used for the list applet (e.g., activities). The administrator may also select the specific fields of these business objects to be mapped to the fields defined in the Gantt chart and list applets. For example, for a Professional Service application, a "Project Start" field and a "Project Complete" field for a business object may be mapped to a "Planned Start" field and a "Planned Complete" field, respectively, defined for the applet.

In designing generic classes of object for the Gantt chart applets and list applets, not all fields may be used by all end applications. In this case, the fields not required by an end application may be turned off. For example, if a "Due Date" logic is not required, then it is not applied for drag-and-drop operations.

Figure 2C:
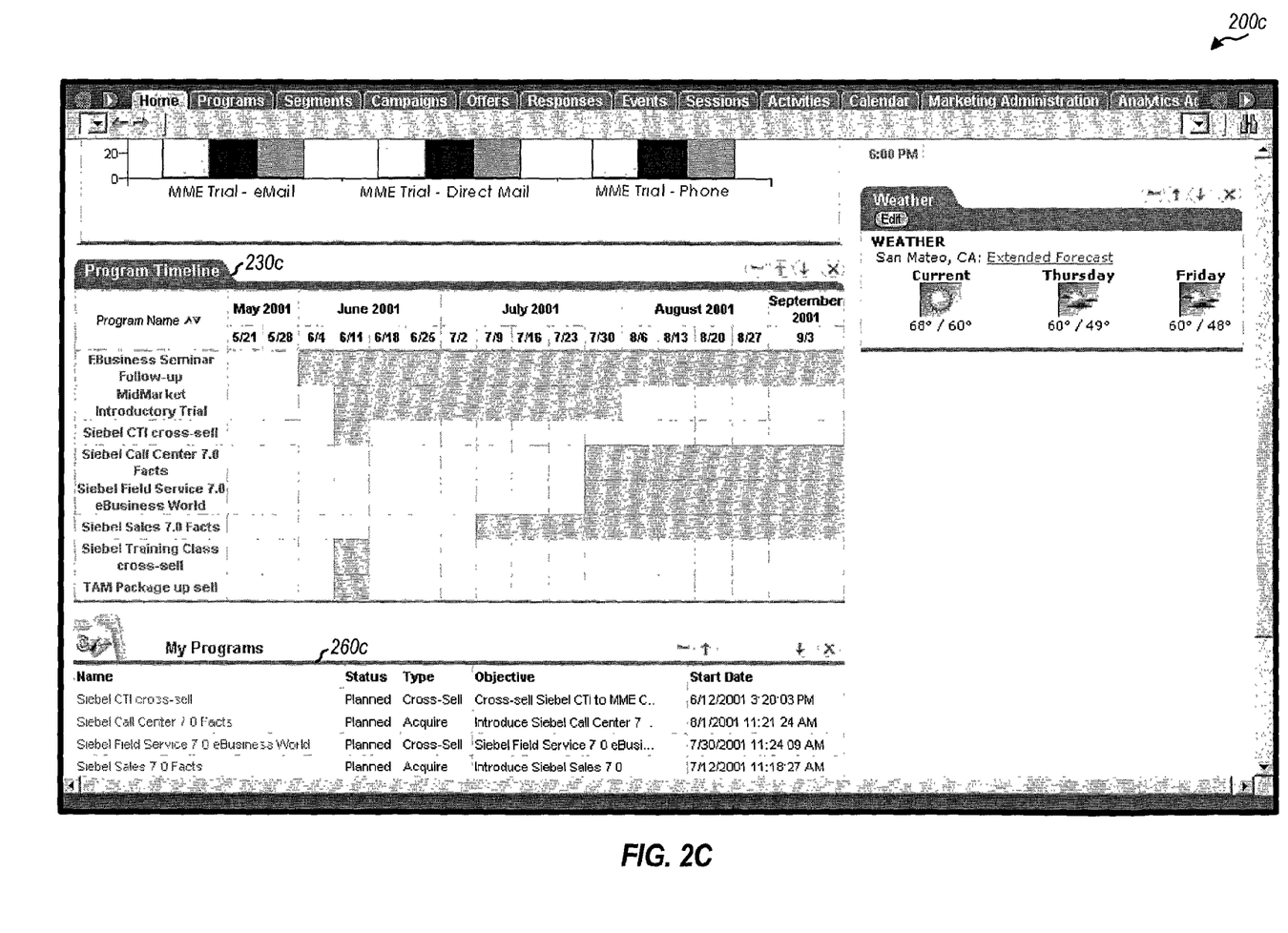

FIG. 2C shows a webpage 200c for a marketing application. In this application, a Gantt chart applet 230c displays "campaigns" for the axis objects of the Gantt chart (instead of employees), and a list applet 260c displays various campaign programs (instead of activities). The programs in list applet 260c may be scheduled on the Gantt chart via drag-and-drop operations, as described above. Via the Gantt chart, the end-user is able to visualize the planned campaigns for the overall marketing strategy, which can assist in designing effective campaigns.

The Gantt chart and list applets may thus be used to display information for various end applications.

For enhanced flexibility, the various operations that may be performed on the browser objects in a given webpage may be configured via the Tools menu. In an embodiment, the administrator or end-user may enable and disable (i.e., turn on and off) specific operations for each type of browser object, and may further select the specific properties that apply.

Features and Capabilities

The techniques described herein may be used for various end applications, to support various operations in addition to those described above, and for manipulation of data in other ways to achieve various results. Some possible applications of the techniques of the invention are described below for illustration, and a wide range of other applications may also be contemplated and is within the scope of the invention.

The techniques described herein may be used to manipulate data located anywhere within a browser window to achieve various results. First, a browser object (for a particular record of data) may be moved to enter, modify, or delete information for the record. For example, a record may be moved (e.g., via drag-and-drop) into a particular location of the webpage to set the status of the record (e.g., to "Completed"). As another example, a record may be moved from one list to another list (e.g., from an Available list to a Selected list) to indicate different actions and operations allowed for and/or supported by the record. Second, a browser object may be moved to establish relationships between records. For example, a particular personnel may be established as an employee of a particular entity by moving the record for the personnel into the record for the entity. Third, a browser object may be moved to organize records. For example, a record may be moved to set up hierarchies, to put an attachment file represented by the record into another record, and so on. Fourth, a browser object may be moved to invoke certain business processes and/or functionalities. For example, a record for a purchase request may be moved to a particular icon to start an approval process (which may be associated with a specific set of actions to be performed on the record) or moved to another icon to indicate its approval.

The techniques described herein may also be used to invoke other functionalities and processes that may be supported by the browser and/or the computer desktop on which the browser is executed. First, a browser object may be moved invoke certain functionality (e.g., to save or print the record). For example, a record may be moved to a particular icon on the webpage or desktop to initiate a print (or a save) of the record. As another example, a record may be moved to another icon on the webpage or desktop to initiate an email to be sent (via various supported communication means including wireline and wireless). The record may then be included in the email as an attachment, or data in the record may be extracted to ascertain the recipients of the email.

A browser object may be moved between locations within the webpage to achieve various results, as described above. A browser object may also be moved from the webpage onto the desktop (e.g., to a particular icon on the desktop), and an object from the desktop may be moved onto the webpage, to achieve other results. The browser objects within the webpage that support such webpage-desktop interaction may be designed to recognize and process such interactions.

The following features (some of which may be end application specific) may be supported by the techniques described herein:

Drag and drop (external)—support a drag of an object from one applet into another applet;

Drag and drop (internal)—support a drag of an object to a different location within the same applet;

Unassign—allow an end-user to unassign an activity by dragging it back to another applet;

Activity resizing—support a "stretch" of an activity within the Gantt chart to lengthen/shorten it (can be achieved via various means);

Support error messages—drag and drop actions may be able to pass messages back from third party scheduling tools to show violation of rules;

Flexible business objects—allow an administrator to specify the x and y axes for the Gantt chart;

Flexible time scale—support hours, days, weeks, and months display on the Gantt chart;

Day drop down—allow an end-user to pick which day(s) to display on the Gantt chart;

Today button—moves the Gantt chart to today;

Default color settings—allow an end-user to set colors (e.g., default colors);

Activity color settings—allow color coding for different Type, Status, and Priority;

Full-screen button—a button that expands the chart to a full-size screen;

Contract commitment time—show graphically the deadline for an activity;

Scrolling—vertical and horizontal scrolling (via scroll buttons if necessary);

Dynamic applets—ability to see skills, instructions, and parts for a particular activity;

Drill down—allow an end-user to drill down on an item by double-clicking on it (a pop-up applet or a new applet may then be displayed to provide the requested information);

Tool tips for employees—shows the employee skills;

Configurable tool tips—allow an end-user to set tool tip contents;

Multi-line tool tips—show tool tips as multiple lines;

Service region drop down—allow an end-user to pick a specific service region to view;

Apply skills button—allow an end-user to search for employees based on skills;

Shift display—show the hours that an end-user is on duty;

Person drop down—allow an end-user to pick which end-users to view;

View Options menu—provide a base class that sets options for the dispatch board, which can be overridden by the administrator and end-users;

Assignment Manager button—allow an end-user to invoke the Assignment Manager to schedule an activity; and Schedule button—allow an end-user to automatically schedule an activity by calling a scheduling engine.

The tool tips on the activity boxes may be configured to display a specific set of fields. This can be achieved via (1) the Tools menu, (2) a configuration file in the database, or (3) a graphical user interface.

A default color scheme may be defined, and each end-user may be allowed to individually define the colors for various objects and parameters based on the user's preference. The default color scheme may be used as the starting point from which other customizations may be made. An option may also be provided to automatically change the color of the texts (e.g., in the data boxes) based on the background color of the boxes. For ease of viewing, light colored texts may be used with dark color background, and vice versa. A "Reset to Default" button may also be provided to reset a modified color scheme back to the default color scheme.

The different color settings may also be used for the Gantt chart and list applets, depending on the end applications, and may be selectable via the Options menu. For example, for a project role, different colors may be used on the display for Requested, Assigned Full time, and Assigned Part time.

The scale as well as the division for the Gantt chart may be made selectable by the end-user. The division may be in units of minutes, hours, days, weeks, months, and so on. The time scale for each tick may be displayed by day or month rather than minutes (which may be set via an Options dialog box). Major and minor time axis labels may also be used, instead of single time axis labels. As an example, months may be subdivided into weeks, which then have days listed under those.

The search criteria for Employee and Service Region pick lists (i.e., the lists that include the employees to be displayed on the Gantt chart) may be specified in the Tools menu. The Employee pick list may be set via the Assignment Manager button and may be designed to be aware of an organization structure defined for an end application. A search may be performed on a single skill or multiple skills. Multiple skills may also be grouped into a single line item (e.g., "Microsoft Certified Engineer" may represent four different skills). This skill grouping may simplify the Skills pick list.

A calendar dropdown may be provided in an applet to allow the end-user to select the specific date(s) to be displayed in the Gantt chart. A Today button may also be provided to move the calendar to today's date.

Figure 2D:
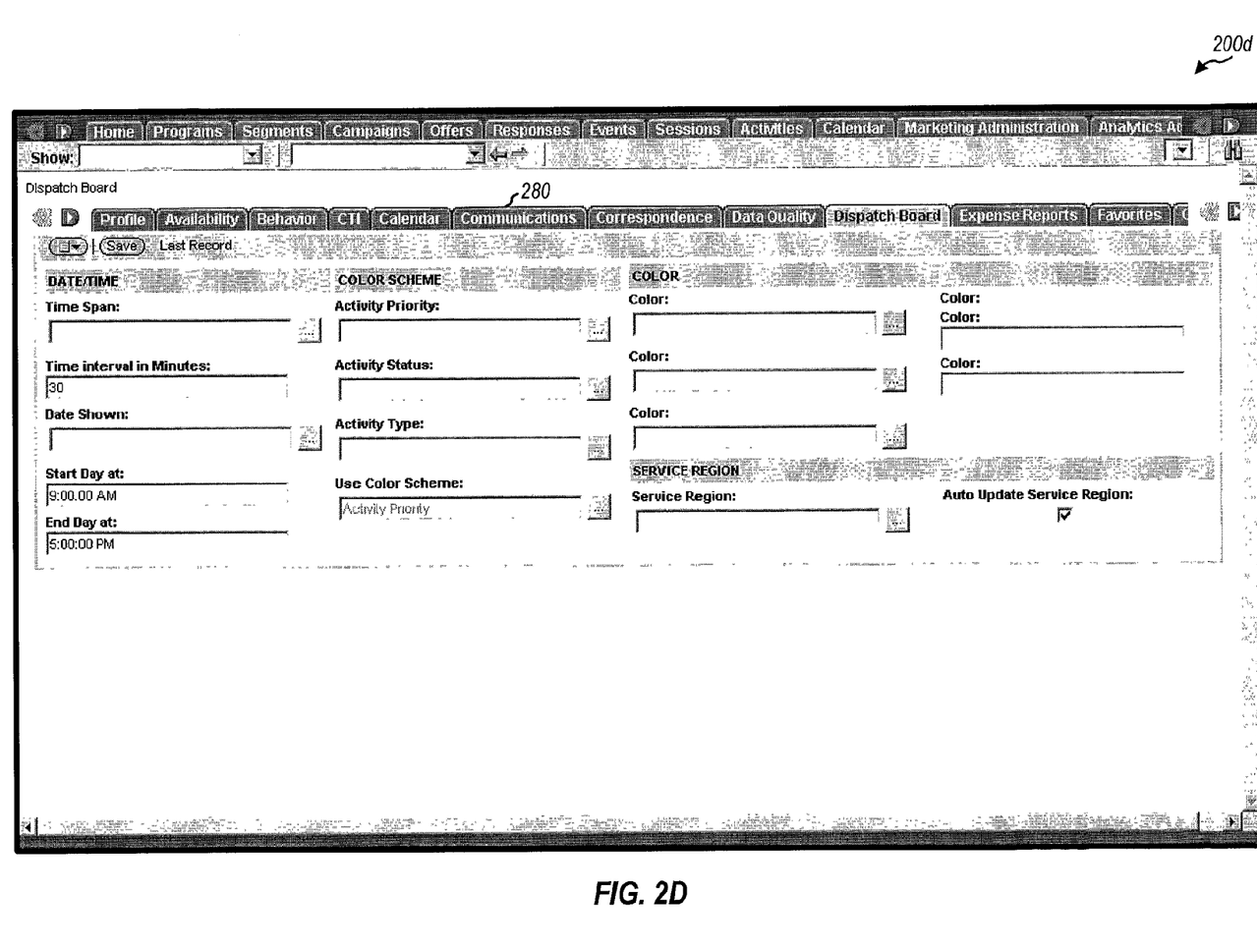
FIG. 2D shows a document for an embodiment of an Options menu used to configure the display of other documents.

FIG. 2D shows a webpage 200d for an embodiment of the Options menu, which may be used to configure the display of the Gantt chart and list applets for the dispatch system. In this embodiment, the left-most column of an applet 280 includes various fields for selecting the time window and time slot for the Gantt chart. Various fields are also provided to allow the end-user to define a unique color scheme and to select various colors or color schemes to be used for various activity parameters. The end-user is also able to select a particular service region for display.

Computer System

Figure 5:
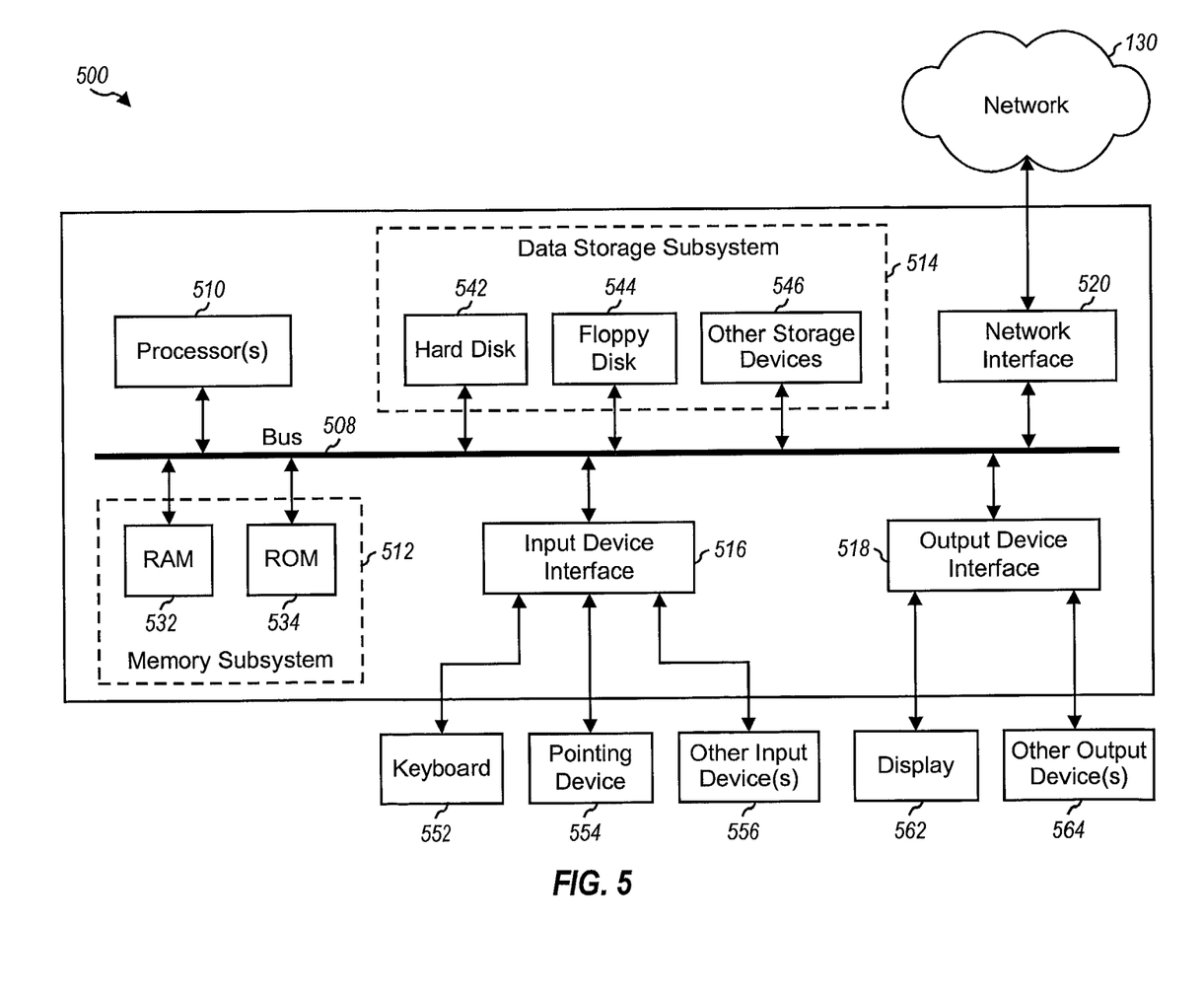
FIG. 5 is a block diagram of a computer system.

FIG. 5 is a block diagram of an embodiment of a computer system 500 that may be used to implement client computer 120 and host computer 110 in FIG. 1. As shown in FIG. 5, system 500 includes a bus 508 that interconnects major subsystems such as one or more processors 510, a memory subsystem 512, a data storage subsystem 514, an input device interface 516, an output device interface 518, and a network interface 520.

Bus 508 provides a means for allowing various components and subsystems of system 500 to communicate with each other. Many of the subsystems and components of system 500 need not be at the same physical location but may be distributed at various locations throughout a communication network. Although bus 508 is shown in FIG. 5 as a single bus, alternate designs for bus 508 may include multiple busses.

Processor(s) 510 perform many of the processing functions for system 500 and communicate with a number of peripheral devices via bus 508. Memory subsystem 512 and data storage subsystem 514 store the program codes and data (e.g., webpages) that implement various aspects of the invention and further provide the functionality of system 500. These program codes (e.g., scripts) and data are then provided to memory subsystem 512 and the codes are executed by processor(s) 510. In a distributed environment, the program codes and data may be stored on a number of computer systems and used by the processors of these systems.

Memory subsystem 512 typically includes a number of memories including a random access memory (RAM) 532 and a read only memory (ROM) 534. RAM 532 is typically used to store program codes and data (e.g., webpages) during program execution and ROM 534 is typically used to store fixed codes and data.

Data storage subsystem 514 provides persistent (non-volatile) storage for program codes and data, and may include a hard disk drive 542, a floppy disk drive 544, and other storage devices 546 such as a compact digital read only memory (CD-ROM) drive, an optical drive, and removable media cartridge disk drive. Each of the storage devices may be associated with removable media (e.g., floppy disks, CD-ROMs, cartridges). One or more of the storage devices may be located at remote locations and coupled to system 500 via communication network 522.

Input device interface 516 provides interface with various input devices such as a keyboard 552, a pointing device 554 (e.g., a mouse, a trackball, a touch pad, a graphics tablet, a scanner, or a touch screen), and other input device(s) 556. In general, the term "input device" is intended to include all possible types of devices and ways to input information into system 500. Via the input devices, the dispatcher is able to select and move activities using the drag-and-drop technique, refresh frames, update data, and perform many other functions.

Output device interface 518 provides an interface with various output devices such as a display 562 and other output device(s) 564. Display 562 may be a cathode ray tube (CRT), a flat-panel device such as a liquid crystal display (LCD), or some other visual devices. In general, the term "output device" is intended to include all possible types of devices and ways to output information from system 500 to a human or to another machine or computer systems. Via the output devices, the dispatcher is provided with the dispatch board and other menus.

Network interface 520 provides an interface with outside networks including network 130. Through network interface 520, system 500 is able to communicate with other computer systems coupled to network 130. Network interface 520 may provide a wireline or wireless interface to network 130.

Many other devices or subsystems (not shown) may also be coupled to system 500. In addition, it is not necessary for all of the devices shown in FIG. 5 to be present to practice the invention. Furthermore, the devices and subsystems may be interconnected in configurations different from that shown in FIG. 5. The operation of a computer system such as that shown in FIG. 5 is readily known in the art and not described in detail herein. The source codes to implement some embodiments of the invention may be operatively disposed in memory subsystem 512 or stored on storage media such as a hard disk, a floppy disk, or a CD-ROM that is operative with a CD-ROM player.

Headings are included herein for reference and to aid in the locating certain sections. These heading are not intended to limit the scope of the concepts described therein under, and these concepts may have applicability in other sections throughout the entire specification.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. A document capable of facilitating user interaction in a browser environment and comprising at least one applet, each of the at least one applet including at least one browser object representative of an entity for an end application, and each of the at least one browser object associated with a respective set of one or more scripts used to facilitate a set of one or more operations permitted for the associated browser object, the respective set of one or more scripts associated only with the associated browser object and not associated with other objects in the applet.

2. The document of claim 1 and comprising a webpage.

3. The document of claim 1, wherein the set of one or more permitted operations for each browser object includes a drag-and-drop operation.

4. The document of claim 1, wherein the set of one or more permitted operations for each browser object includes a stretch operation.

5. The document of claim 1, wherein one of the at least one browser objects is a source object if it is selectable to originate a particular operation, and is a target object if it is selectable as a destination for a particular operation.

6. The document of claim 1, wherein the one or more scripts for each browser object are operative to perform a first set of actions if the browser object is selected as a source object for a particular operation, and to perform a second set of actions if the browser object is selected as a target object for the particular operation.

7. The document of claim 6, wherein the first set of actions includes generating a data transfer object having included therein data associated with the browser object.

8. The document of claim 6, wherein the particular operation is a drag-and-drop operation, and wherein the one or more scripts for each browser object selectable as a target object are further operative to perform a first subset of actions if a selected source object is dropped onto the target object.

9. The document of claim 8, wherein the one or more scripts for each browser object selectable as a target object is further operative to perform a second subset of actions if the selected source object is dragged into the browser object and a third subset of actions if the selected source object is dragged out of the browser object.

10. A computer program product for facilitating user interaction in a browser environment, comprising:

code for describing a document having included therein a plurality of source and target objects and a plurality of scripts;

code for receiving a first indication of a particular operation being initiated on a selected source object;

code for a first script associated with the selected source object and executed to generate a data transfer object having included therein data associated with the selected source object, the first script associated only with the selected source object and not associated with other objects in the document;

code for receiving a second indication of the particular operation being completed on a selected target object;

code for a second script associated with the selected target object and executed to operate on the data included in the data transfer object to effectuate the particular operation, the second script associated only with the selected target object and not associated with other objects in the document; and a data storage medium configured to store the codes.

11. A computer program product for facilitating user interaction in a browser environment, comprising a computer-usable medium having embodied therein computer-readable program codes for:

describing a document having included therein a plurality of source and target objects and a plurality of scripts;

receiving a first indication of a particular operation being initiated on a selected source object;

a first script associated with the selected source object and executed to generate a data transfer object having included therein data associated with the selected source object, the first script associated only with the selected source object and not associated with other objects in the document;

receiving a second indication of the particular operation being completed on a selected target object; and a second script associated with the selected target object and executed to operate on the data included in the data transfer object to effectuate the particular operation, the second script associated only with the selected target object and not associated with other objects in the document.

12. The computer program product of claim 11, wherein the particular operation is a drag-and-drop operation or a stretch operation.

13. The computer program product of claim 11, wherein the computer-usable medium is further embodied with computer-readable program codes for:

receiving a third indication of the data transfer object being moved into a representation for a potential target object;

modifying the representation for the potential target object in response to receiving the third indication;

receiving a fourth indication of the data transfer object being moved out of the representation for the potential target object; and restoring the representation for the potential target object in response to receiving the fourth indication.

14. A method for facilitating user interaction in a browser environment, comprising:

receiving a document having included therein a plurality of source and target objects and a plurality of scripts;

receiving a first indication of a particular operation being initiated on a selected source object in the document;

executing a first script associated with the selected source object to generate a data transfer object having included therein data associated with the selected source object, the first script associated only with the selected source object and not associated with other objects in the document;

receiving a second indication of the particular operation being completed on a selected target object in the document; and executing a second script associated with the selected target object to operate on the data included in the data transfer object to effectuate the particular operation, the second script associated only with the selected target object and not associated with other objects in the document.

15. The method of claim 14, wherein the document is a webpage.

16. The method of claim 14, wherein the particular operation is a drag-and-drop operation.

17. The method of claim 14, wherein the particular operation is a stretch operation.

18. The method of claim 14, further comprising:
receiving a third indication of the data transfer object being moved into a representation for a potential target object; and
modifying the representation for the potential target object in response to receiving the third indication.

19. The method of claim 18, further comprising:
executing a third script associated with the potential target object to check the data included in the data transfer object against data associated with the potential target object, the third script associated only with the potential target object and not associated with other objects in the document, and
wherein the modification of the representation is based on results of the check.

20. The method of claim 19, further comprising:
changing color of the representation for the potential target object if the selected source object can be associated with the potential target object.

21. The method of claim 18, further comprising:
receiving a fourth indication of the data transfer object being moved out of the representation for the potential target object; and
restoring the representation for the potential target object in response to receiving the fourth indication.

22. The method of claim 14, wherein the second script initiates a call to update the selected target object to reflect the completion of the particular operation.

23. The method of claim 14, further comprising:
receiving an updated document with updates for the selected source and target objects.

24. The method of claim 14, wherein the document includes a plurality of applets for a plurality of display windows.

25. The method of claim 24, wherein the selected source object is located in a first applet and the selected target object is located in a second applet.

26. The method of claim 24, wherein the selected source and target objects are both located in the same applet.

27. The method of claim 24, wherein at least one applet represents a Gantt chart.

28. The method of claim 27, wherein the Gantt chart is configurable to display a specific type of browser objects selected from among a plurality of possible types of browser objects.

29. The method of claim 24, wherein at least one applet represents a list applet.

30. The method of claim 14, wherein the first and second indications are signaled by events fired by a browser used to display the document.

31. The method of claim 14, wherein the first script facilitates the particular operation on the selected source object.

32. The method of claim 14, wherein the second script facilitates the particular operation on the selected target object.

33. The method of claim 14, wherein the first script performs the processing at the start of the particular operation.

34. The method of claim 14, wherein the second script performs the processing to complete the particular operation.

* * * * *